Figure 1:
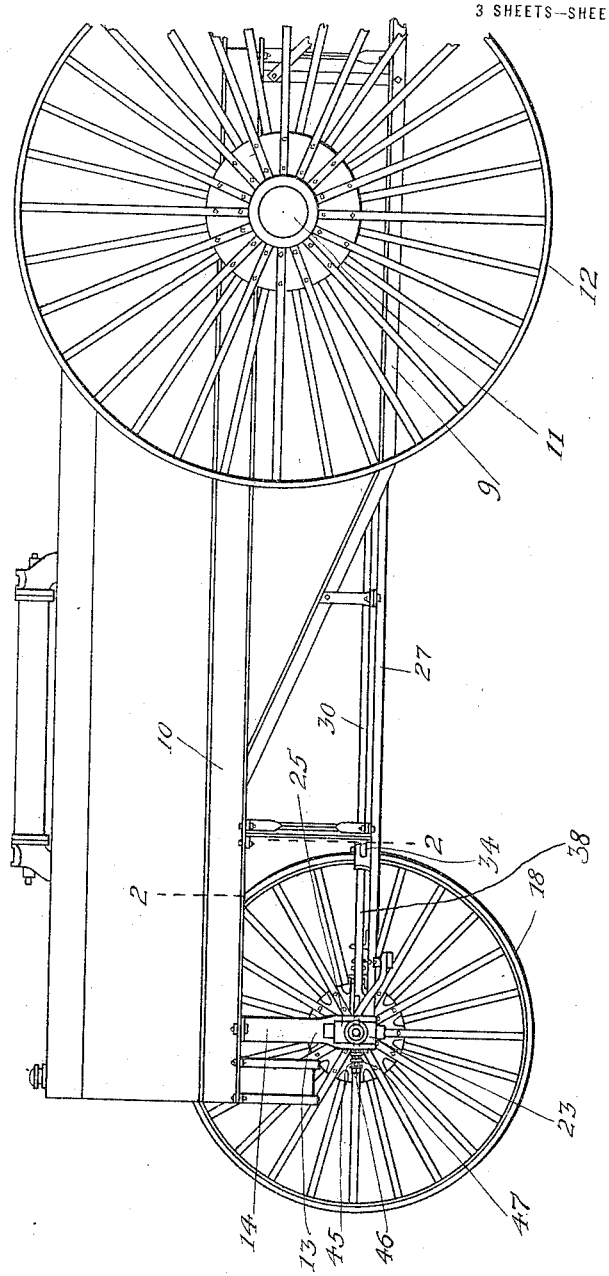

E. M. WHEELOCK.
TRACTION ENGINE.
APPLICATION FILED JULY 29, 1912. RENEWED MAY 5, 1916.

1,208,062.
Patented Dec. 12, 1916.
3 SHEETS—SHEET 1.

Witnesses:
Thos. Lagaard
H. A. Bowman.

Inventor:
Edwin M. Wheelock
By F. A. Whitley
his Attorney

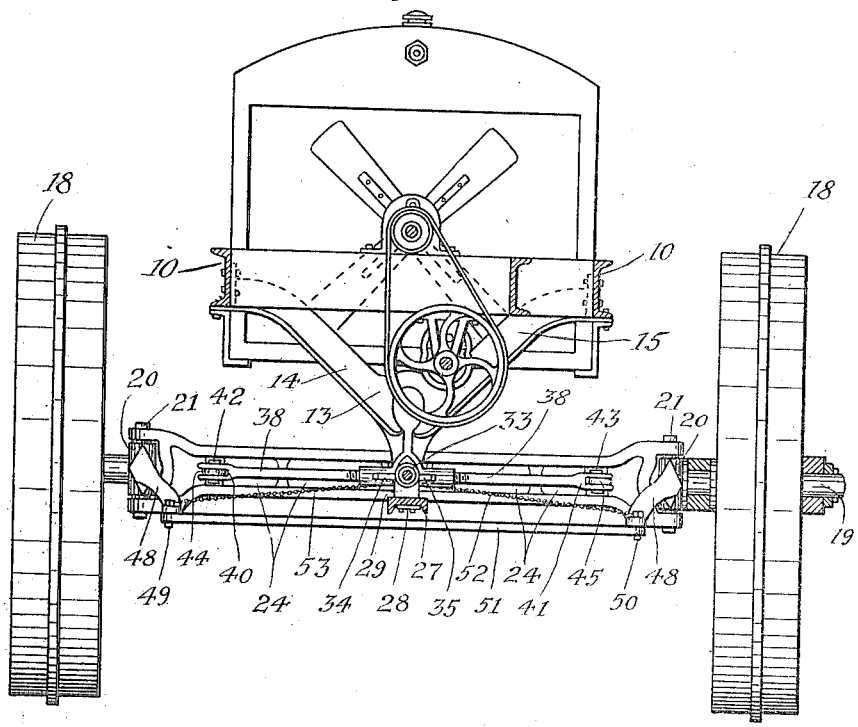
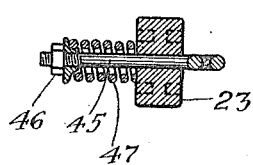
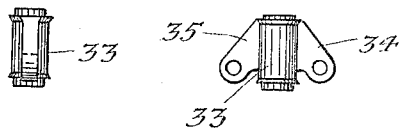

E. M. WHEELOCK.
TRACTION ENGINE.
APPLICATION FILED JULY 29, 1912. RENEWED MAY 5, 1916.
1,208,062. Patented Dec. 12, 1916.
3 SHEETS—SHEET 3.
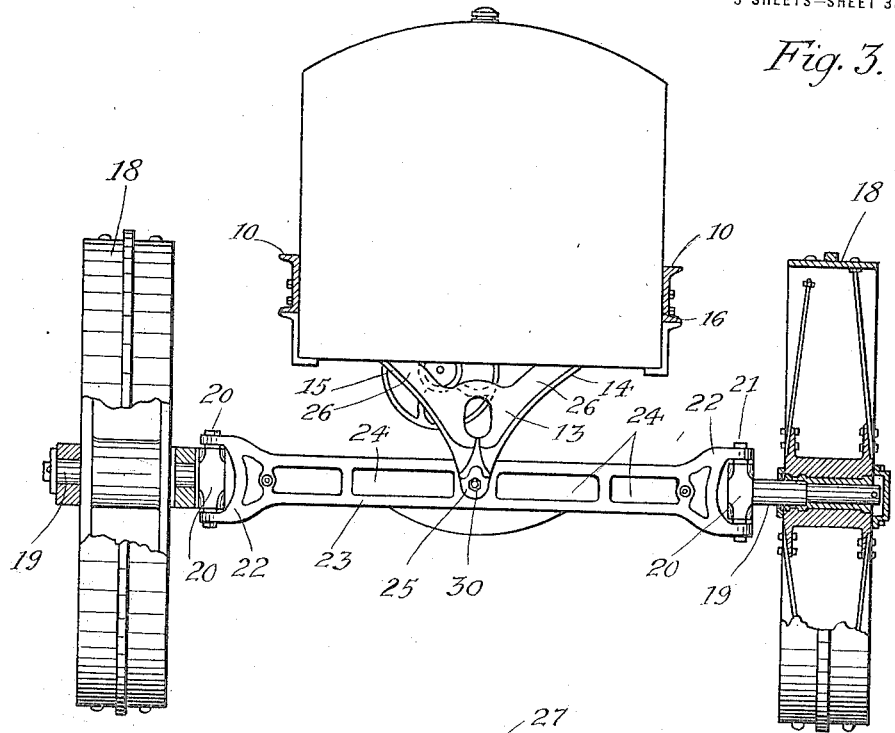
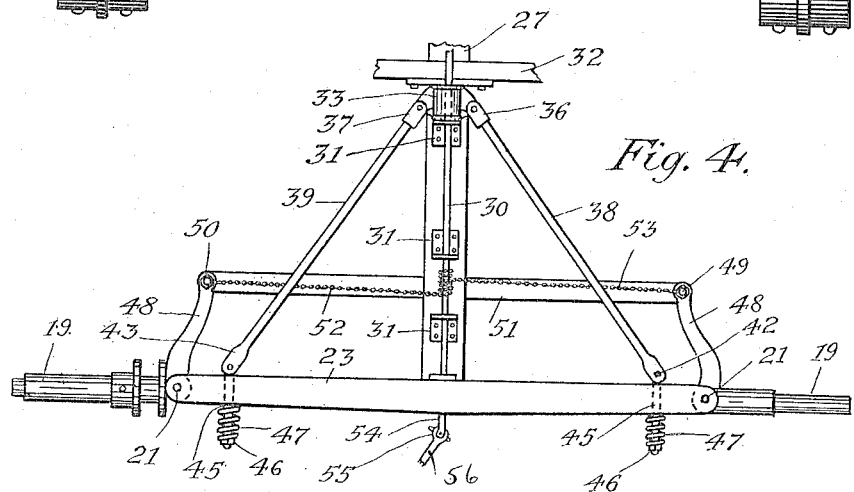
Witnesses:
Theo. Legaard
H. A. Bowman
Inventor:
Edwin M. Wheelock
By F. A. Whiteley
his Attorney.

UNITED STATES PATENT OFFICE.

EDWIN M. WHEELOCK, OF WINONA, MINNESOTA.

TRACTION-ENGINE.

1,208,062.  Specification of Letters Patent.  Patented Dec. 12, 1916.

Original application filed June 9, 1911, Serial No. 632,274. Divided and this application filed July 29, 1912, Serial No. 712,079. Renewed May 5, 1916. Serial No. 96,256.

*To all whom it may concern:*

Be it known that I, EDWIN M. WHEELOCK, a citizen of the United States, residing at Winona, in the county of Winona and State of Minnesota, have invented certain new and useful Improvements in Traction-Engines, of which the following is a specification.

My invention relates to traction engines and particularly to the means of supporting the front part of the engine frame upon the forward or steering wheels of the engine.

The invention of this application is a division of my application Serial Number 632,274 filed June 9, 1911.

It is the object of my invention to provide means for accomplishing this support such that the front axle of the engine shall be of the divided or automobile type having a central portion which does not oscillate in a horizontal plane but which is free to oscillate to a limited extent in a vertical plane.

It is the prime object of my invention to provide a structure of this sort such that the axle supporting the front part of the frame at one point only will be capable of such oscillation in a vertical plane and yet will powerfully and effectively brace the axle against oscillation in a horizontal plane.

The full objects and advantages of my invention will appear in connection with the detailed description thereof, and are particularly pointed out in the claims.

In the drawings illustrating the application of my invention in one form, Figure 1 is a side elevation of a traction engine employing my invention, most of the parts being shown in outline only, and the near front wheel being removed. Fig. 2 is a section on line 2—2 of Fig. 1 viewed toward the front of the machine. Fig. 3 is a front elevation of the traction engine. Fig. 4 is a plan view of the axle structure with other parts removed. Figs. 5, 6, and 7 are views of details.

As shown in Fig. 1, the traction engine comprises a main upper deck frame 10 and a lower deck frame 9 suspended therefrom, said upper frame providing bearings for an axle 11 upon which are mounted rear traction wheels 12, as described in the aforesaid application. The front portion of the frame 10 has secured thereto a yoke casting 13, the arms 14 and 15 of which are provided with seats 16 and 17 to which the side members of frame 10 are securely bolted. The front or steering wheels 18 are mounted upon short axles 19 which in turn are provided with vertical bearing knuckles 20 mounted upon pins 21 positioned between the bifurcated ends 22 of the front axle 23, said axle being of substantially rectangular cross section, as indicated in Fig. 1, but preferably paneled out as indicated at 24 to reduce the weight of material required for a given strength of axle required. The yoke member 13 supports the frame upon axle 23 at the center thereof by means of a bifurcated lower end 25 which straddles the axle 23, as shown in Fig. 1. Each of the arms 14 and 15 is provided with a central web 26 extending from the seat flanges 16 and 17, respectively, for strengthening said arms. As shown in Fig. 1, a reach bar 27 extends from the lower deck of the rear frame structure longitudinally of the machine and is bolted at 28 to an inside portion 29 of the bifurcated end of yoke member 13. A part of the means for steering the engine comprises a rod 30 mounted in ears 31 upon the reach 27. Said rod 30 extends through the bifurcated lower end 25 of the supporting member 13 and through the body of the axle 23, in this way securing the supporting member 13 and the axle 23 together so as to permit oscillation of said axle in a vertical plane but to prevent such oscillation in a horizontal plane.

Since the torsional strain to which the steering wheels may be subjected as the machine is driven over rough ground is very great, tending to oscillate the axle 23 in a horizontal plane, I provide means for effectively resisting this strain while at the same time giving perfect freedom of oscillation of the front axle in a vertical plane. A part of the frame of the machine comprises a transverse angle member 32 bolted to the reach 27, and between this angle member and one of the ears 31, I mount upon the rod 30 a swiveling wing-piece 33, as shown in detail in Figs. 6 and 7, said piece being freely rotatable upon rod 30. The member 33 is provided with apertured wings 34 and 35 to which are pivotally connected bifurcated sockets 36 and 37 into which are threaded the ends of rods 38 and 39, respectively, the other ends of said rods being similarly bifurcated as shown at 40 and 41, and being pivotally connected at 42 and 43 to eye-bolts 44 and 45 extending through apertures in the axle 23 near the ends thereof, as more particularly shown in Figs. 4 and 5. The eye-bolts 44 and 45 extend beyond the axle 23 a certain distance. Said eye-bolts are threaded and provided with nuts and washers 46 and between said washers and the axle 23 are powerful compression springs 47. This arrangement will permit a very slight play of the axle 23 in a horizontal plane while at the same time amply protecting the parts against breakage or injury from the aforesaid torsional strains, and permitting the most complete freedom of movement in a vertical plane.

Upon the knuckles 20 are arms 48 pivotally connected at their ends by means of bolts 49 and 50 with a connecting link 51, and secured to the ends of said arms at the points 49 and 50 are chains 52 and 53 extending in opposite directions about the steering rod 30 which rod may be extended through the axle 23 as indicated at 54 and connected by means of a universal joint 55 with a rod 56 having connection with a furrow guide wheel of a well known type.

The functions of my front steering wheel sustaining mechanism will be apparent. The axle 23 oscillates freely in the bifurcated end 25 of the supporting yoke member 13, such oscillation taking place in a vertical plane. The front and rear plates of the aforesaid yoke member do not bind the axle absolutely rigidly but permit a very small amount of play in a horizontal direction. The brace rods 38 and 39 are in the plane of the axle 23 and, by reason of the swiveling connection with the eye-piece 33 oscillate freely with said axle in its vertical oscillations. The connection of said brace rods with the axle through the eye-bolts 45 and powerful springs 47 holds the axle 23 sufficiently stiff while, at the same time, permitting the small degree of oscillation in a horizontal plane which will relieve the axle structure of such rigidity as might cause damaging shocks in case the front wheels are driven against rocks or other obstructions.

I claim:

1. In a traction engine, a frame comprising upper and lower longitudinal members, traction wheels and an axle therefor journaled in said frame and supporting the same from the upper members at two points, a pair of front wheels and an axle connected therewith supporting said frame at a single point in the plane of the lower members, said axle being connected with the frame so as to have freedom for oscillation in a vertical plane, and means relatively movable with respect to the lower frame members and connected therewith and with the ends of the front axle to restrain said front axle from oscillation in a horizontal plane.

2. In a traction engine, a double deck frame, traction wheels and an axle therefor journaled in and supporting said frame at two points of the upper deck, a standard depending from the front end of the upper deck, a reach bar connected with said standard, a pair of steering wheels and an axle therefor connected therewith supporting said frame at a single point adjacent the junction of said standard and reach, said axle being connected so as to have freedom for oscillation in a vertical plane, a steering rod extending along said reach bar and through the center of oscillation of the front axle, and rods connected to and extending rearwardly in the plane of said front axle and having pivotal connection with the steering rod for restraining horizontal oscillation of the axle.

3. In a traction engine, a double deck frame, traction wheels and an axle therefor journaled in and supporting said frame at two points in the plane of the upper deck, a pair of steering wheels and an axle connected therewith supporting said frame at a single point in the plane of the lower deck, said axle being connected to the frame so as to have freedom for oscillation in a vertical plane, a steering rod journaled in said lower deck of the frame, and arms pivotally connected with said rod and with the front axle near each end thereof, respectively.

4. In a traction engine, a frame, traction wheels and an axle therefor journaled in and supporting said frame at two points, a pair of steering wheels and an axle connected therewith supporting said frame at a single point, said axle being connected to the frame so as to have freedom for oscillation in a vertical plane, a rod horizontally mounted in the plane of said point of connection, and arms pivotally connected with said rod and with the front axle near each end thereof, respectively.

5. In a traction engine, a double deck frame, traction wheels and an axle therefor journaled in and supporting said frame at two points in the plane of the upper deck, a pair of steering wheels and an axle connected therewith supporting said frame at a single point in the plane of the lower deck, said axle being connected to the frame so as to have freedom for oscillation in a vertical plane, a steering rod journaled in said lower deck of the frame and extending freely through the center of said front axle, a wing-piece rotatably mounted on said rod but restrained from movement therealong, and arms pivotally connected with said wing-piece and with the said axle near each end thereof, respectively.

6. In a traction engine, a frame, traction wheels and an axle therefor journaled in and supporting said frame at two points, a pair of steering wheels and an axle connected therewith supporting said frame at a single point, said axle being connected to the frame so as to have freedom for oscillation in a vertical plane, a rod, a wing-piece rotatably mounted on said rod but restrained from movement therealong, and arms pivotally connected with said wing-piece and with the said axle near each end thereof, respectively.

7. In a traction engine, a frame, traction wheels and an axle therefor journaled in and supporting said frame at two points, a pair of steering wheels and an axle connected therewith supporting said frame at a single point, said axle being connected to the frame so as to have freedom for oscillation in a vertical plane, a rod, a wing-piece rotatably mounted on said rod but restrained from movement therealong, eye-bolts extending loosely through said front axle near the ends thereof, springs on said eye-bolts outside of said axle, and rods connecting said wing-piece and each of said eye-bolts, respectively.

8. In a traction engine, a frame, traction wheels and an axle therefor journaled in and supporting said frame at two points, a pair of steering wheels and an axle connected therewith supporting said frame at a single point, said axle being connected to the frame so as to have freedom for oscillation in a vertical plane, and resilient means connected with a frame member to restrain said front axle from oscillation in a horizontal plane.

In testimony whereof I affix my signature in the presence of two witnesses.

EDWIN M. WHEELOCK.

Witnesses:
H. A. BOWMAN,
F. A. WHITELEY.

Copies of this patent may be obtained for five cents each, by addressing the "Commissioner of Patents, Washington, D. C."